W. H. SELLS.
RESILIENT WHEEL.
APPLICATION FILED FEB. 5, 1915.
1,280,316.
Patented Oct. 1, 1918.
2 SHEETS—SHEET 1.
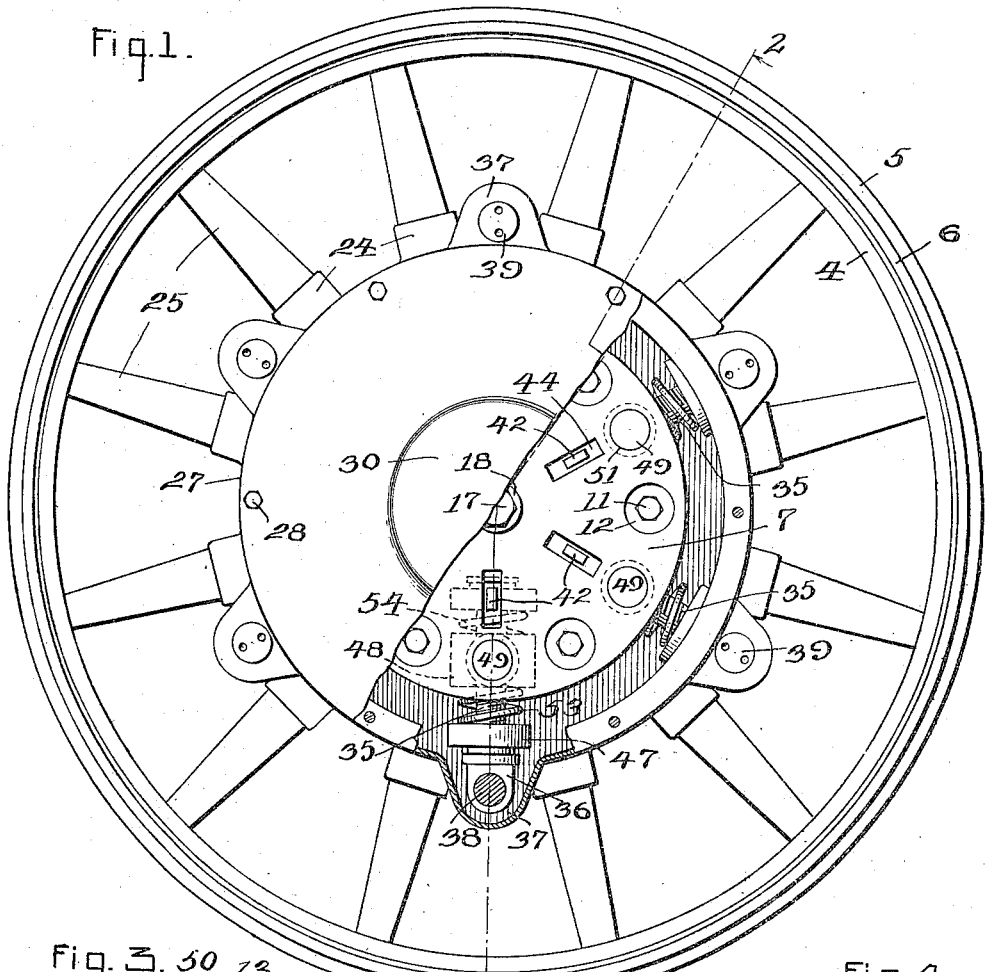
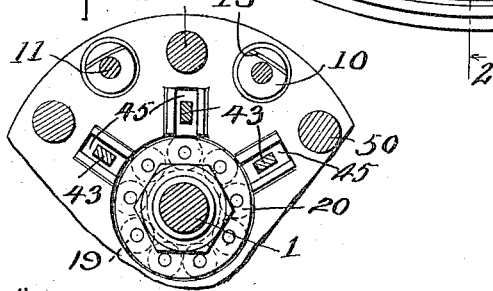
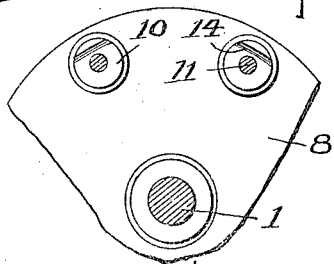
WITNESSES
INVENTOR
William H. Sells,
by Geyer & Popp,
ATTORNEYS

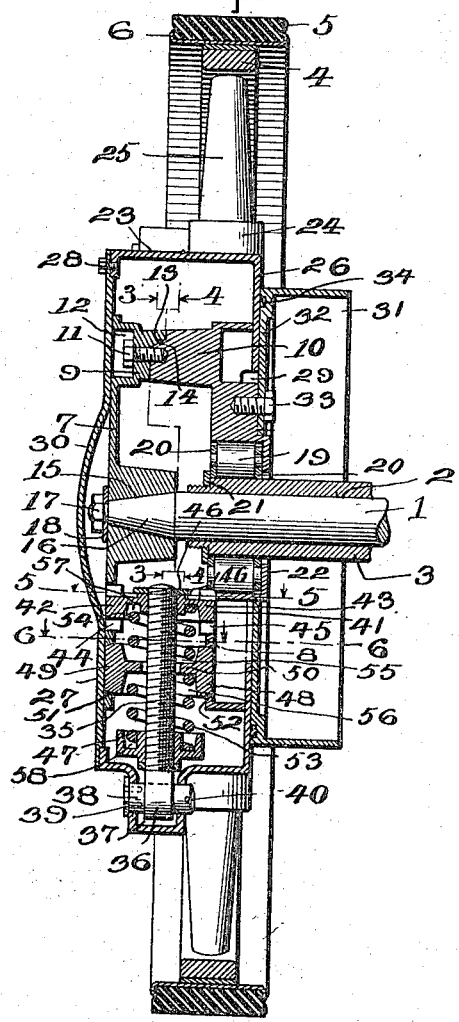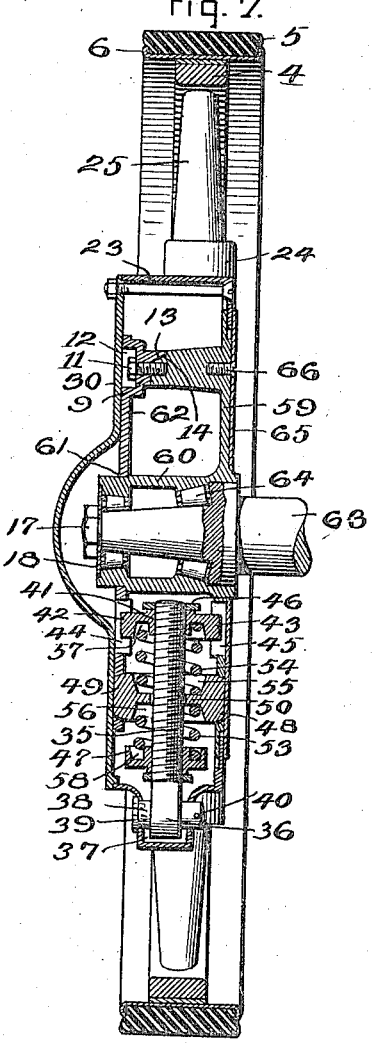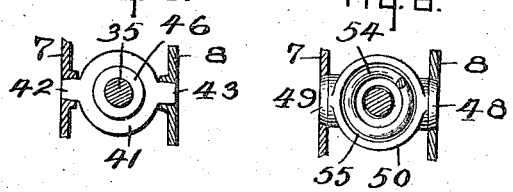

UNITED STATES PATENT OFFICE.

WILLIAM H. SELLS, OF BUFFALO, NEW YORK.

RESILIENT WHEEL.

1,280,316.      Specification of Letters Patent.      Patented Oct. 1, 1918.

Application filed February 5, 1915. Serial No. 6,254.

*To all whom it may concern:*

Be it known that I, WILLIAM H. SELLS, a citizen of the United States, residing at Buffalo, in the county of Erie and State of New York, have invented new and useful Improvements in Resilient Wheels, of which the following is a specification.

This invention relates to a resilient wheel and has for its object the production of a wheel of this character which is more particularly designed for automobiles and which will not only provide a resilient connection between the axle and the felly of the wheel which is of simple, inexpensive and durable construction but which also operates to prevent sudden rebound of the wheel and also prevent circumferential play between the relatively movable inner and outer sections of the hub of the wheel so as to insure prompt and effective transmission of power from the inner to the outer hub section and also exert an effective operation of the brake.

In the accompanying drawings: Figure 1 is a side elevation of a resilient wheel embodying my improvements and showing the same applied to the rear or driving axle of an automobile. Fig. 2 is a vertical section of the same taken in line 2—2, Fig. 1. Figs. 3 and 4 are fragmentary vertical transverse sections taken in the correspondingly numbered lines in Fig. 2. Figs. 5 and 6 are fragmentary sections taken in the correspondingly numbered lines in Fig. 2. Fig. 7 is a vertical section showing my improvements applied to the front or steering wheel of an automobile.

Similar characters of reference indicate corresponding parts throughout the several views.

Referring to Figs. 1–6, 1 represents the driving or rear axle or shaft of an automobile which may be turned in any suitable manner and which is journaled in a bearing 2 forming part of the stationary axle housing 3 which is mounted on the frame of the automobile. 4 represents the felly of the wheel which receives the tire 5 adapted to bear upon the ground. This tire may be of any suitable construction but as shown in the drawings the same is constructed of solid rubber and is seated in a rim 6 secured to the periphery of the felly.

Between the axle 1 and the felly of the wheel are arranged the means which operate to produce a driving connection between the axle and the felly and resiliently retain the same concentrically relatively to each other so that the load imposed upon the axle will be yieldingly resisted and constantly tend to return the felly and axle to their normal central position in which they are axially in alinement.

In its general organization these means comprise an inner hub section which is operatively connected with the axle and an outer hub section which is operatively connected with the felly. The inner hub section preferably comprises front and rear disks or plates 7, 8 of substantially circular form which are spaced apart in a direction lengthwise of the axle and are connected rigidly with each other adjacent to their peripheral portions by means of a plurality of rearwardly projecting spacing lugs 9 formed on the rear side of the front disk and engaging at their rear ends with the front ends of forwardly projecting spacing lugs 10 formed on the front side of the rear disk, as shown in Fig. 2. Each pair of corresponding lugs on these disks are connected by means of a screw 11 which has its head arranged in a counter sunk recess 12 formed on the outer side of the front disk 7. These two disks are preferably centered relatively to each other and the screws connecting the same are relieved from radial strains by providing the rear end of each of the spacing lugs on the front disk with an inclined face 13 which engages with a correspondingly inclined face 14 formed on the front end of the companion rear spacing lug of the rear disk, these inclined surfaces on the two sets of lugs of these disks together forming a conical joint so that when the same are normally drawn together by tightening of the screws 11 the front and rear disks will be securely held in a central position relatively to each other and these screws will be relieved of any lateral strains. The front disk of the inner hub section is provided centrally with a rearwardly flaring conical socket or opening 15 which receives the conical portion 16 at the front end of the axle and this disk is securely clamped on the axle, so that the same and its companion rear disk will turn with the axle, by means of a screw nut 17 applied to the outer end of the axle and bearing against the outer side of the front disk through the medium of an interposed washer 18, as shown in Figs. 1 and 2. The rear disk of the inner hub section is rotatably mounted upon the adjacent part of the axle housing 3 preferably by means of an annular row of rollers 19 interposed between the bore of the central opening in this rear disk and the adjacent part of the periphery of the axle housing, these rollers being held in their proper relative position by means of retaining rings 20 on which opposite ends of these rollers are mounted, as is customary in this type of roller bearing. At its front end the axle housing is provided with a screw nut 21 forming a shoulder which engages the front roller bearing ring and holds the roller bearing and the inner hub section against forward displacement on the axle housing. The rear disk of the inner hub section is provided on its rear side with an inwardly projecting annular flange 22 engaging with the rear ring of the rollers 19 so as to confine this roller bearing against rearward displacement on the axle housing.

The outer hub section may be variously constructed but, as shown in Figs. 1 and 2, the same preferably comprises a substantially cylindrical outer wall 23 which is provided on its outer side with a plurality of sockets 24 each of which is adapted to receive the inner end of a spoke 25, the outer end of the latter being secured to the adjacent part of the felly, a rear disk 26 projecting inwardly from the rear edge of the cylindrical wall and preferably formed integrally therewith and a front disk 27 which is preferably detachably connected at its outer edge with the front edge of the cylindrical wall by means of screws 28, as shown, although any other suitable means may be provided for this purpose, if desired. The rear disk of the outer hub section is provided with a central opening 29 so as to permit the inner part of the rear disk of the inner hub section to project rearwardly through the same while the outer part of this rear disk of the inner hub sections bears with its rear side against the front side of the rear disk of the outer hub section, as shown in Fig. 2. The front disk of the outer hub section extends entirely across the space within the cylindrical wall so as to completely inclose the inner hub section and the parts associated therewith. The outer part of the front disk of the outer hub section bears with its rear side against the outer part of the front side of the front disk of the inner hub section while the central part 30 of the front disk of the outer hub section is bulged or deflected forwardly so as to clear the clamping nut 17 of the axle. It will be noted that by this means the inner hub section engages slidingly in a radial direction with the outer hub section so that these hub sections are capable of moving radially but are prevented from moving axially relatively to each other.

31 represents the brake drum which is provided with a radial web 32 secured with its outer part by means of screws 33 to the rear side of the inner part of the rear disk of the inner hub section while the outer part of this web engages with the rear side of the rear disk of the outer hub section. By this means the brake drum is utilized to further retain the inner and outer hub sections against axial movement relatively to each other. Dirt, sand and grit are prevented from entering the joint between the web of the brake drum and the rear disk of the outer hub section by means of an annular packing 34 arranged in an annular groove formed on the front side of the web of the brake drum adjacent to the periphery thereof and engaging with the rear side of the rear disk of the outer hub section, as shown in Fig. 2.

The means whereby a driving connection is produced between the inner and outer hub sections and these parts are cushioned relatively to each other and are preferably constructed as follows:

35 represents a plurality of connecting rods which are arranged radially relatively to the axis of the hub sections and associated parts and preferably distributed equidistant in the circumferential row around the same. Each of these rods is arranged with its inner part between the front and rear disks of the hub sections and is provided at its outer end with a coupling head 36. Each of these coupling heads is arranged within an outwardly projecting pocket 37 formed on the adjacent part of the cylindrical wall of the outer hub section and is pivotally connected therewith by means of a horizontal longitudinal pivot pin 38 passing through the pivot head of the connecting rod and corresponding openings formed in the front and rear sides of this pocket and provided at its front end with a head 39 bearing against the front side of this pocket while its rear end is provided with a cotter pin 40 bearing against the rear side of the same, as shown in Fig. 2. The inner part of each of the connecting rods is provided with an external screw thread and at its inner end the same is slidingly connected with the inner hub section so that the latter and the respective connecting rod are capable of radial movement relatively to each other. This sliding connection may be effected by various means but as shown in the drawings this means preferably comprises an inner bearing member or collar 41 having an internally screw threaded opening which engages with the inner portion of the thread on the connecting rod, and front and rear guide lugs 42, 43 formed on the front and rear sides of this inner collar and engaging with radial slots 44, 45 formed in the adjacent parts of the front and rear disks of the inner hub section. This inner collar is securely clamped in position on the respective connecting rod by means of a clamping nut 46 applied to the inner end of this rod and bearing against the inner side of said inner collar, as shown in Fig. 2. The guide lugs 42, 43 are somewhat narrower than the width of the guide slots 44, 45 and the openings in the bearing members 48 are somewhat larger than the diameter of the rods 35 so as to allow of the requisite play of the rods 35 on a plane crosswise of the axis of the wheel when the same is in use.

47 represents a plurality of outer bearing members or collars each of which is adjustably connected with the outer part of one of the connecting rods by means of an internal screw thread formed in a central opening in this collar and engaging with the thread of the respective connecting rod adjacent to its pivot head.

48 represents a plurality of intermediate bearing members each of which is preferably constructed in the form of a collar or ring and surrounds one of the connecting rods between the companion inner and outer bearing collars. Each of these intermediate collars is free to move lengthwise upon the respective connecting rod by providing the central part of this collar with an opening through which the connecting rod passes freely, as shown in Fig. 2. On its opposite sides this intermediate collar is provided with front and rear supporting lugs or projections 49, 50, which engage respectively with supporting openings 51, 52 formed in the adjacent parts of the front and rear disks of the inner hub section. These supporting lugs of the intermediate collar are preferably of circular and conical form, the front lug 49 tapering forwardly and the rear lug 50 tapering rearwardly and the openings of the front and rear disks with which they engage being of correspondingly circular and conical form.

53 represents a plurality of outer cushion springs each of which is preferably constructed in the form of a coil from spring metal and arranged around one of the connecting rods and between the inner side of an outer collar on one of the connecting rods and the outer side of the companion intermediate collar.

54 represents a plurality of inner springs each of which is also preferably constructed in the form of a coil of spring metal and arranged around the inner part of one of the connecting rods and bearing with its inner end against the outer side of the inner bearing collar thereon and the inner side of the companion intermediate collar, as shown in Fig. 2. When a load is imposed upon the axle of the wheel—the inner hub section is depressed and is yieldingly supported by those of the outer springs 53 which are arranged below the center of the wheel and those of the inner springs 54 which are arranged above the center of the wheel, this being due to the descent of the intermediate collars which compress those outer springs which are arranged below the center of the wheel and are at this time supported by the outer collars on the outer ends of the connecting rods while those inner springs arranged above the center of the wheel are compressed toward the inner supporting collars which are also arranged above the center of the wheel. By this means the cushioning effect of the wheel is distributed around the entire circumference of the same and all of the springs are successively brought into play for yieldingly supporting or cushioning the load imposed upon the axle when the wheel is rolling over the ground.

When the tire of the wheel strikes an obstruction in the road and is moved upwardly suddenly or quickly relatively to the axle the resilient action of the springs is the same inasmuch as during this time those outer springs which are arranged below the center of the wheel are compressed upwardly against the companion intermediate collars by those outer collars which are arranged below the axis of the wheel and those inner springs which are arranged above the axis of the wheel are compressed upwardly against the companion intermediate collars by those inner collars which at this time are above the axis of the wheel. An upward rebound of the axle after a sudden depression of the same is cushioned by those of the inner springs which are arranged below the axis of the wheel and those of the outer springs which are arranged above the axis of the wheel, this being due to the inner bearing springs being compressed upwardly by the lower intermediate collar against the lower inner collar and the upper outer springs being compressed by the upper intermediate collars against the upper outer collars so that this cushioning device at this time operates as a shock absorber and prevents any sudden or jarring action so that the automobile is not affected injuriously nor discomfort caused to the passengers.

When the axle of the wheel is a driving axle and part of the means whereby the automobile is propelled, as is the case in the construction shown in Figs. 1 and 2, the power of the axle for rotating the felly of the wheel is transmitted from the inner hub section to the outer hub section in part directly through the medium of the inner collars and the connecting rods and partly through the medium of the intermediate collars and the springs 53, 54 which are imposed between opposite sides of the intermediate collars and the inner and outer collars on the connecting rods. This transmission of power from the intermediate collars to the connecting rods is promoted by providing the inner and outer sides of each of the intermediate collars with sockets 55, 56 in which the adjacent ends of the companion inner and outer springs are securely seated and also providing each of the inner and outer collars with sockets 57, 58, respectively, in which the adjacent ends of the companion inner and outer springs are securely seated. A mechanical driving connection is therefore obtained from the inner hub section to the outer section through the medium of the inner bearing collars and the connecting rods and an elastic driving connection is secured between these parts through the medium of the intemediate collars, and the inner and outer springs.

While the inner and outer hub sections are changing their position radially relatively to each other during the operation of the wheel, the several connecting rods are always retained in position relatively to these hub sections so that a reliable driving connection is maintained between these hub sections and no slack can occur at any time in a circumferential direction. This is due to the fact that the intermediate collars receive the principal part of the driving strain which is transmitted in turn to the inner and outer bearing collars through the medium of the inner and outer springs and the inner bearing collars are free to slide radially in the inner hub sections while the wheel is turning under the load. Each of the connecting rods is therefore practically supported at two points on the inner hub section, that is to say, at its inner end by means of its inner bearing collar and between its inner and outer ends by the companion intermediate bearing collar, which two bearing points are in alinement and practically prevent the respective connecting rod from being deflected out of its normal position regardless of the load which is imposed upon the wheel and also regardless of the variable positions which this connecting rod assumes relatively to the axis of the wheel.

By removing the front disks of the inner and outer hub sections, the inner and outer bearing collars are easily accessible for adjusting them on the connecting rods so as to obtain the proper tension of the springs to carry the load which is to be borne, thereby rendering it possible to easily adapt the wheel for various kinds of work.

In adapting my invention to a wheel which is used as the front or steering wheel of an automobile, as shown in Fig. 7 the rear disk 59 of the inner hub section is provided with a forwardly projecting sleeve 60 which passes through an opening 61 in the companion front disk 62 and is journaled upon the front axle 63 by means of a roller bearing 64 or any other suitable manner, and the rear side of the rear disk of the inner hub section is provided with a cover plate 65 which is secured thereto by means of screws 66 or the like and engages with the rear side of the rear disk of the outer hub section. In other respects the driving and cushioning means interposed between the inner and outer hub sections are constructed substantially the same in the front driving wheel as the corresponding parts in the rear or driven wheel heretofore described.

My improved resilient wheel is very strong and durable and capable of safely carrying the heaviest loads which are likely to be imposed upon the same without liability of deranging or breaking any of the parts and without interfering with the propulsion or the control of the automobile. Furthermore, all of the parts can be readily assembled and are easy of access for inspection, adjustment or repairs and in its completed form the same presents a neat and attractive appearance.

I claim as my invention:

1. A resilient wheel comprising inner and outer hub sections which are movable radially relatively to each other, and means for producing a positive driving and cushioning connection between said hub sections comprising a plurality of radial connecting rods each of which is connected at its outer end with said outer hub section and slidable radially at the inner end in said inner hub section, a plurality of inner bearing members each of which is mounted on the inner end of one of the connecting rods and is slidably connected with the inner hub section, a plurality of outer bearing members each of which is mounted on the outer part of one of the connecting rods, a plurality of intermediate bearing members each of which is arranged on one of the connecting rods between the companion inner and outer bearing members and which is movable lengthwise of said rod and mounted on the inner hub section, a plurality of inner springs each interposed between each intermediate bearing member and the companion inner bearing member, and a plurality of outer springs each interposed between one of the intermediate bearing members and the companion outer bearing member.

2. A resilient wheel comprising an inner hub section having front and rear disks each of which is provided with a plurality of pairs of radial slots and a plurality of pairs of supporting openings, an outer hub section having front and rear disks which engage with the front and rear sides of the front and rear disks of the inner hub section and also provided with a plurality of outwardly projecting pockets, a plurality of radial connecting rods arranged between said front and rear disks and each pivotally secured at its outer end in one of said pockets, a plurality of inner bearing collars each mounted on the inner end of one of said rods and provided on its opposite side with lugs which slide in a pair of said slots in said inner hub section, a plurality of outer bearing collars each of which is mounted on the outer part of one of said connecting rods, a plurality of intermediate bearing collars each of which is slidable lengthwise on one of said connecting rods between the inner and outer collars thereon and provided on its opposite sides with supporting lugs which engage in a pair of said supporting openings in the inner hub section, a plurality of inner springs each interposed between one of said intermediate bearing collars and the adjacent inner collar, and a plurality of outer springs each interposed between one of said intermediate bearing collars and the adjacent outer bearing collar.

3. A resilient wheel comprising an inner hub section having front and rear disks which are provided on their opposing sides with coöperating spacing lugs and screws connecting the corresponding pairs of said lugs, each of said lugs having an inclined face which engages with a correspondingly inclined face on the companion lug and the inclines of the several lugs together forming a conical joint between the lugs of the front and rear disks of the inner hub section, an outer hub section having front and rear disks engaging with the corresponding disks of the inner hub section, and resilient means operatively connecting said inner and outer hub sections.

Witness my hand this 4th day of February, 1915.

WILLIAM H. SELLS.

Witnesses:
THEO. L. POPP,
ANNA HEIGIS.

Copies of this patent may be obtained for five cents each, by addressing the "Commissioner of Patents, Washington, D. C."